US005897057A

United States Patent [19]
Hulls

[11] Patent Number: 5,897,057
[45] Date of Patent: *Apr. 27, 1999

[54] CONTROLLED ATMOSPHERE TRANSFER SYSTEM

[75] Inventor: John Hulls, Point Reyes Station, Calif.

[73] Assignee: Dauenhauer Manufacturing, Inc., Santa Rosa, Calif.

[*] Notice: This patent is subject to a terminal disclaimer.

[21] Appl. No.: 08/655,260

[22] Filed: Jun. 5, 1996

Related U.S. Application Data

[63] Continuation-in-part of application No. 08/488,076, Jun. 7, 1995, Pat. No. 5,662,267.

[51] Int. Cl.⁶ .......................... B05B 15/04; B05B 17/04; B05B 5/08
[52] U.S. Cl. ................. 239/8; 239/13; 239/104; 239/176; 239/124; 239/288
[58] Field of Search ............................ 239/77, 78, 104, 239/124, 127, 288

[56] References Cited

U.S. PATENT DOCUMENTS

| | | | |
|---|---|---|---|
| 1,465,557 | 8/1923 | Oldham . | |
| 4,569,486 | 2/1986 | Balmer | 239/166 X |
| 4,679,735 | 7/1987 | Pay | 239/708 |
| 4,865,628 | 9/1989 | Iwanczyk | 55/74 |
| 4,893,755 | 1/1990 | Keathley | 239/288 X |
| 5,002,227 | 3/1991 | Ehrenberg | 239/172 |
| 5,028,002 | 7/1991 | Whitford | 239/8 |
| 5,246,166 | 9/1993 | Payne | 239/104 |
| 5,380,367 | 1/1995 | Bartone | 222/360 X |
| 5,469,653 | 11/1995 | Roehrick | 47/1.7 |

FOREIGN PATENT DOCUMENTS

| | | | |
|---|---|---|---|
| 126304 | 12/1945 | Australia | 239/104 |
| 665706 | 7/1965 | Belgium | 239/104 |
| 546395 | 9/1957 | Canada . | |
| 291837 | 11/1988 | European Pat. Off. | 239/120 |
| 2606672 | 5/1988 | France . | |

OTHER PUBLICATIONS

Brochure: IMAG–DLO "Innovative Engineering and Technology for Sustaining Agriculture and Horticulture" 23 pages (1994).

D.L. Peterson et al. "Tunnel Sprayer For Dwarf Fruit Trees" Transactions of the ASAE, vol. 17(3), pp.:709 and 711 (1994).

*Primary Examiner*—Kevin Weldon
*Attorney, Agent, or Firm*—Limbach & Limbach L.L.P.

[57] ABSTRACT

The method and apparatus of the present invention provides a more efficient and cost effective method and apparatus for applying agents to plants, crops, vegetation, and trees, while avoiding the problems associated with conventional impingement velocity tunnel sprayers. The method and apparatus of the present invention utilizes the conditions in a controlled atmosphere to deposit agents on plants and provides a device which increases the maneuverability of pesticide spray rigs.

30 Claims, 8 Drawing Sheets

5,897,057

CONTROLLED ATMOSPHERE TRANSFER SYSTEM

RELATED APPLICATION

This application is a continuation-in-part application of pending U.S. patent application Ser. No. 08/488,076 filed Jun. 7, 1995, now U.S. Pat. No. 5,662,267

BACKGROUND

The present invention relates generally to an apparatus and process for applying pesticides and other agents and materials to agricultural crops, vines, trees and vegetation.

Insecticides and other agents are commonly applied to crops and other types of vegetation using a variety of techniques, including tunnel sprayers. In a conventional tunnel sprayer, a tractor is used to pull or push a spray rig apparatus such as is disclosed in U.S. Pat. No. 4,893,755 issued to J. Phillip Keathley ("Keathley"). In sprayers, similar to Keathley, a canopy or tunnel is formed around a segment of crops or vegetation. A spraying apparatus is then used to inject the desired agent into the confined canopy area. The canopy avoids, to some extent, drift of the agent away from the desired site of application. It is also known to use troughs within a tunnel sprayer canopy to recover and recirculate agent which has deposited on the inner walls of the canopy.

Conventional tunnel sprayers deposit aerosol particles of an agent on crops by spraying the agent directly on to the crops. Thus, existing sprayers known in the art rely on the kinetics of the aerosol particles. There are several mechanisms and effects at work in such an aerosol environment. The principle factor is the droplet size in the aerosol spray. The larger the droplets, the less the surface area on the droplets for a given amount of spray, and the less loss to evaporation for a given amount of spray. This would seem to favor large droplets. However, other effects then come into play.

If a relatively small number of large droplets are used to coat a plant, there will have to be significant overcoverage to insure that the plants are wetted. This means that some areas of the plant surface will receive excessive pesticide to insure complete coverage, and thus the application will be inefficient. In addition, the possibility of both excessive droplet size and precipitation from collision is greatly increased with larger initial droplet sizes.

If, in a conventional sprayer, the droplets are too small, there will be much greater surface area for a given volume of spray, and there will be excessive evaporation and drift. Given these two conflicting effects, the tendency for spray applications has been to use the largest droplets consistent with achieving coverage. The majority of sprays are applied well in excess of 40 microns for field applications. While prior tunnel sprayer limit some of the drift problems, it does not eliminate the conflicting requirements of droplet size and application.

Additional constraints are presented by the requirements for bringing the droplets into contact with the plants. There has been much study of the impact mechanism whereby droplets wet a surface. A collision between aerosol droplets and a surface such that they wet a surface is referred to in the literature as an "effective" collision. There are a large number of factors that influence the mechanism but the size of droplets was found to have an appreciable effect. In a study by Hartley and Brunskill, *Surface Phenomena in Chemistry and Biology*, Permagon Press (1958) collisions on pea leaves (which have a somewhat hydrophobic surface) were effective when the droplet size was less than 50 microns, and largely ineffective when greater than 125 microns. This shows that efficient wetting is favored by small droplet size. On rough surfaces of the plant, the effect was largely independent of the angle of impact.

In a conventional sprayer, the small droplets in the aerosol mix would lose velocity rapidly and would drift in the atmosphere and would either coagulate into larger droplets, or evaporate and become water vapor. However, the larger droplets would require greater numbers of impacts to produce effective coverage of the plant, and higher velocities.

The other major factor affecting the ability of the droplets to have effective collisions with the plant surface is the wetting of the surface itself. It has been shown in studies by McCully that when particles or the surface are rendered hydrophobic, the effectiveness of collisions is significantly decreased. (McCully, C, et al., *Ind. Eng. Chem.*, 48, 1512 (1956), as referenced in Fuchs, et al, *The Mechanics of Aerosols*, Dover Press (1989).) The influence of wettability is greatly increased when the kinetic energy of the collisions is low. In the past, pesticide application has relied on high kinetic energy either by the use of large droplets or large droplets in conjunction with high velocity. Thus, the ideal state would be to have high wettability and low kinetic energy while still maintaining the effectiveness of collision.

Conventional tunnel sprayers known in the art provide neither of the two conditions, high wettability and low kinetic energy, required for ideal application of pesticide agents to crops. As seen in U.S. patent application Ser. No. 2,977,715 issued to M. E. Lindsay ("Lindsay") the agent is randomly deposited on the leaves of the vegetation by velocity impingement of the spray onto the vegetation. Lindsay teaches spraying agent into a column of air and then impinging the air column upon plant foliage at an increased velocity. Although Lindsay discloses spraying the aerosol agent into a duct before blowing the air column into the canopy, Lindsay does nothing to change the aerosol environment. Thus, the conditions identified above which produce the best application of the agent are absent from Lindsay. In addition, Lindsay does nothing to control the saturation of the atmosphere surrounding the plants.

Conventional devices control the force of impingement by the pressure supplied by blowers. In devices such as Lindsay, the air discharge is at a substantial velocity such that it causes agitation of the plants; however, because such spray rigs rely on impingement velocity, they do not always apply the agents evenly on the vegetation. Second, more agent than would be desired is deposited on the ground beneath the plants. These factors increase the financial and environmental costs of operating such devices because large quantities of pesticide agents are required and wasted.

In addition to providing inefficient and ineffective coverage of the agent on the target crops, the conventional devices are further disadvantageous because their method of application results in shingling. Shingling occurs when the force of the spray or air is so strong that the leaves of the crops press against each other. The result is that one leaf covers all or a portion of the leaf which is behind it, thereby preventing coverage of both leaf surfaces. This phenomenon is inherent in the conventional tunnel sprayers because of the high velocity required to impinge the large aerosol particles against the crops.

As a result of the above factors, the problem facing the development of a more efficient method and apparatus for the application of agents to crops is to integrate a variety of conflicting requirements involving evaporation, droplet size, inertia of particles, wettability of surfaces and design of a suitable apparatus.

A further problem associated with the use of tunnel sprayers is the turning radius required to turn the tunnel sprayer around in the headland area. The headlands are minimized to increase the percentage of land utilizable for planting; thus, there is a limited turning radius. Therefore, minimal space at the end of a row of crops is provided. Tractors pulling the conventional sprayer, especially tunnel sprayers, cannot be used or are used with difficulty in such areas. Thus, it is desirable to minimize the turning radius of the tractors used in spraying operations and the equipment which they pull.

It is therefore an object of this invention to provide a more efficient and cost effective method and apparatus for applying agents to crops, vegetation, and trees, while avoiding the problems associated with conventional impingement velocity tunnel sprayers.

Another object of the invention is to utilize a process which will create a large number of effective collisions while nevertheless operating with comparatively low velocities.

Yet another object of this invention is to provide an apparatus and method which will decrease the operation costs of applying agents by maximizing the actual deposition of agents to the crops.

A still further object of the invention is to reduce wasted pesticide agents due to evaporate loss in the deposition process by the means of application and recapture from within the apparatus for reapplication to the crops.

A still further object of the present invention is to minimize the turning radius required for the tractor when pulling a tunnel sprayer.

SUMMARY

In order to meet these objects, the invention described herein relates to methods and apparatus for applying an agent to plants, vines, trees, or vegetation using the condensation and coagulation effects of conditions in an oversaturated atmosphere. In a preferred embodiment an apparatus according to the invention comprises a saturation chamber for containing a saturated atmosphere, the saturated atmosphere being at a first pressure, a deposition chamber, the deposition chamber having a pressure less than the pressure of the saturation chamber; and a means for creating the saturated atmosphere containing at least one agent. The saturated atmosphere may be created using the agent or created separately using, for example, a water base fog. In the latter case, the agent is injected into the water base fog saturated atmosphere.

In another embodiment, an apparatus of the present invention includes a recovery and recirculation system, further including a plurality of brushes or flaps formed in the deposition chamber, to capture excess agent that is not applied to the plants.

In a still further embodiment, an apparatus of the invention includes a means for maintaining the deposition chambers parallel to a vertical axis of the plants.

In yet another embodiment, an apparatus according to the invention comprises a means for lifting the deposition chambers above the crops so that a tractor carrying the apparatus may turn in small radius areas, such as headland areas in planted fields.

BRIEF DESCRIPTION OF THE DRAWINGS

The invention will be better understood by reference to the appended Figures, in which:

FIG. 1 is a block diagram depicting the operational steps of the invention in an apparatus according to the invention.

DETAILED DESCRIPTION

Figure 1:
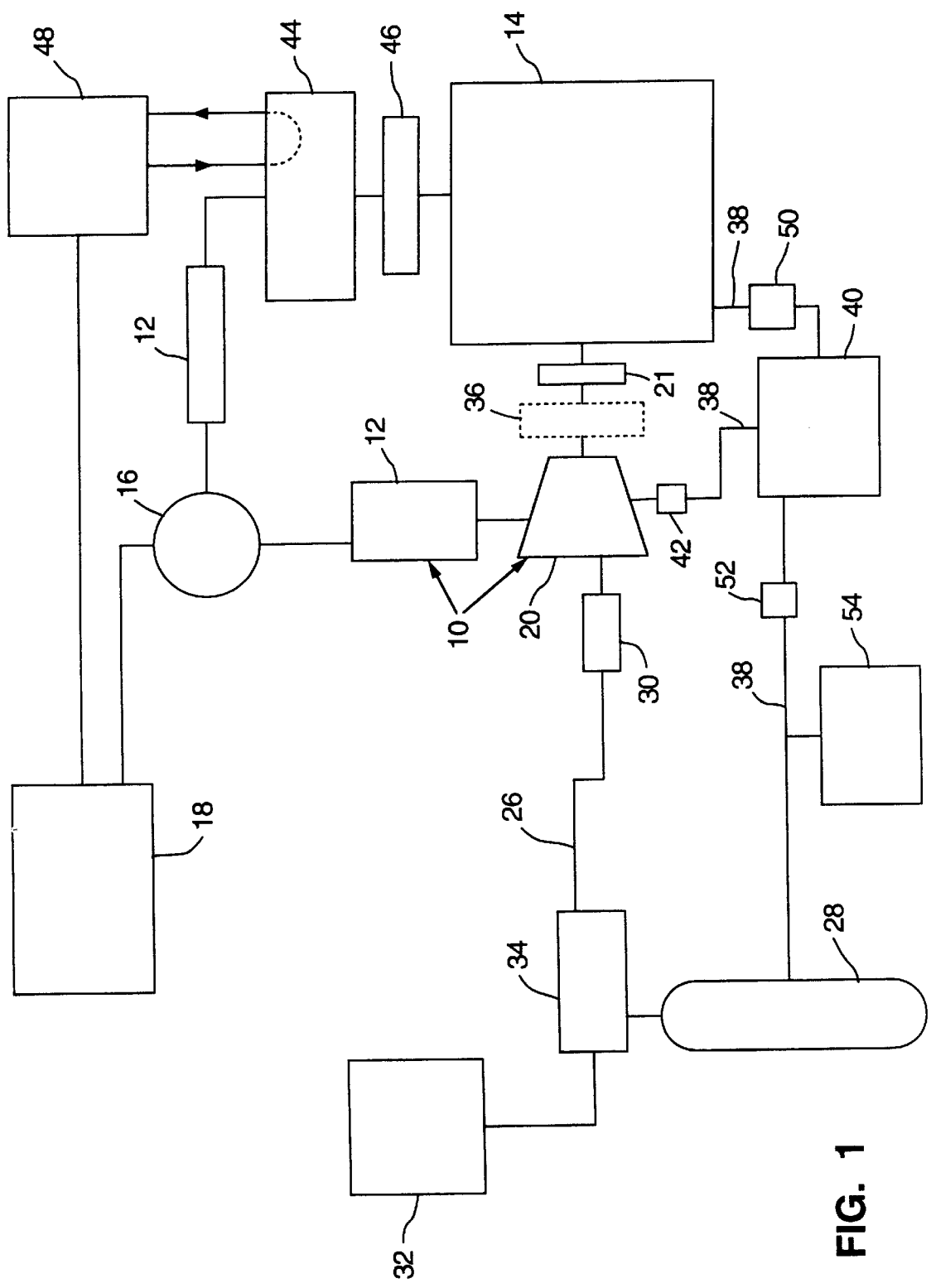
FIG. 1 is a block diagram depicting the process of the invention.

The invention will now be described in detail. The apparatus and method of the present invention rely on conditions in an atmosphere created around plants to apply an agent, such as a pesticide or other chemical or organic product, to plants such as vines, crops, shrubs, trees, or other vegetation. The vines, crops, shrubs, trees, or other vegetation treatable by the apparatus and method of the present invention will sometimes be referred to simply as plants. By utilizing conditions in a controlled atmosphere, the apparatus and method of the invention minimizes the shortcomings of conventional tunnel sprayers which rely on the kinetics of aerosol particles.

As discussed above, efficient wetting is favored by saturated atmosphere, small droplet size, and low droplet kinetic energy. At the same time, it is desirable to reduce evaporation from the drops. The present invention meets these seemingly conflicting needs by creating an atmosphere of small, slow moving droplets in a saturated or oversaturated atmosphere. The size and velocity of the droplets used in the present invention leads to increased wetting efficiency and the saturated or oversaturated atmosphere guarantees that little or no evaporation will occur regardless of droplet size.

One of the main advantages of the controlled atmosphere application as opposed to air blast sprayers is the reduction of evaporation in the controlled atmosphere sprayer by spraying into a saturate atmosphere. The surface area of the droplets is proportional to the square of the diameter of the droplets whereas the volume is proportional to the cube of the diameter. Thus, for a given volume of sprayed liquid, the surface area of a fine spray will be many times that of a coarse spray. For Instance, if the droplets are a quarter the size, there will be four times as much surface area for a given volume of agent. In a non-saturated atmosphere, the rate at which materials evaporate is in direct relationship to the surface area; therefore, when a fine spray is used to apply agricultural chemicals, much of the material will evaporate into the atmosphere, especially on air blast sprayers. In contrast, in the present invention, the deposition chamber is held in a saturated or slightly oversaturated condition and therefore, (by definition of a saturate atmosphere), the air cannot absorb any more moisture; consequently, fine droplets, with their much more effective wetting capabilities, can be used without evaporative losses. In fact, the oversaturate atmosphere will coalesce as fine droplets on the surface of the plants. Thus, by spraying fine droplets into a saturated or slightly oversaturated environment where they will not evaporate, a significant loss of chemicals to the environment is avoided.

In the present invention, the agent is added in droplet form into a saturate or over-saturate atmosphere such that the droplets remain in droplet form and do not evaporate prior to deposition on the plant surface. This deposition mechanism is very different from that used in conventional sprayers.

A further advantage of the deposition mechanism of the present invention is that wetting of surfaces by droplets is also significantly increased in a saturate atmosphere. Wettability is increase by a factor of about four over ambient conditions when the atmosphere around the plants is saturate, i.e. 100% humidity (McCully, C, et al, *Ind. Eng. Chem.*, 48, 1512 (1956), as referenced in Fuchs, et al, *The Mechanics of Aerosols*, Dover Press (1989).)

In a method of the invention, a saturated atmosphere containing the agent to be applied is formed under pressure. The saturated atmosphere is then transferred to an area, proximate to the plants, which is at ambient pressure or a pressure less than that of the saturated atmosphere. As a result of the pressure differential, an oversaturated atmosphere is created which is circulated through the area proximate to the plants. Through the process of condensation and coagulation of the aerosol particles, the agent is efficiently applied to the plants. The method can be practiced by forming the saturated atmosphere with the liquid agent. Should the crop shape or configuration warrant, the saturated atmosphere and agent may be injected independently of each other. In such case, the saturated atmosphere can be formed first such as with water vapor, and then the agent is injected into the saturated atmosphere.

By use of an oversaturated atmosphere to surround the plants, the desired agent is deposited on the plant leaves through the atmospheric conditions created in a manner which avoids the usual velocity-impingement phenomenon, typical of conventional spray rigs. For this reason even sensitive or delicate plants may be treated.

In the present invention, the spray need only be injected into the saturated atmosphere with air velocity adequate to suspend the fine droplets and oversaturated atmosphere and bring it into contact with the plants sufficient to deposit the desired coverage of chemicals. In this manner the present invention circumvents the high air velocity problems of the conventional sprayers; namely, shingling and the production of low pressure areas on the back of leaves, both of which reduce the effectiveness of the coverage.

In a preferred embodiment of the present invention, fine droplets are suspended in the deposition chamber using air blown in from the bottom of the chamber. This embodiment ensures that the droplets are gently propelled towards the recirculating inlets and that sufficient coverage is maintained in the upper corners of the chamber.

A method of the invention may also be practiced by placing an electrostatic charge in the saturated atmosphere to increase the deposition of the agent on the plants.

Naturally, the agent used in the apparatus will need to be in liquid form. However, agents which are typically produced in powder form can be solubilized in order to create the liquid agent for the process. It would also be possible to use gaseous agents that are soluble in the carrier liquid used. Those who commonly use sprayers will recognize that the apparatus of the invention can therefore be used with any liquid or solubilized agent.

A preferred embodiment of the apparatus of the invention, shown in FIGS. 1–4, will now be described. Referring to FIG. 1, a saturation chamber 10 includes a plurality of ducts 12 coupled to the deposition chamber 14. The saturation chamber 10 is pressurized by blowers 16 hydraulically powered by a hydraulic pump 18. The blowers 16 preferably operate at 3–5 psi. The volume of saturation chamber 10 is variable, but it must provide a sufficient volume of mixing where the pressure is above ambient such that the air volume will become saturate upon injection of the agent. The saturation chamber 10 is pressurized such that there is pressure differential of several psi between saturation chamber 10 and deposition chamber 14. The optimum pressure depends on the agent and the rate of application.

The ducts 12 terminate on a plurality of vent boxes 20 which are exposed to an interior cavity 22 of deposition chamber 14. The vent boxes 20 are located in proximity to the lower edges of deposition chamber 14. A flow director 21 may also be used to direct the air flow into the deposition chamber 14.

Again referring to FIG. 1, the means for creating a saturated atmosphere will now be described. A supply line 26 carries the agent in liquid form, from a feed tank 28 to conventional spray nozzle injectors 30 protruding into at least one vent box 20. The nozzle injectors 30 produce droplets in the range of 30 to 60 microns. Equivalent injectors, such as, disk type atomizers, commonly known as controlled droplet applicators (CDAs) may also be used. A feed pump 32 pressurizes the supply line 26. The supply line 26 is conventional rubber, plastic, or metallic tubing, approximately ½ inches in diameter. The feed pump 32 is powered by hydraulic pump 18. The feed tank 28 is coupled to supply line 26 via an educator 34. The agent is drawn from feed tank 28 by educator 34 when hydraulic pump 32 is actuated. As the agent is injected into vent boxes 20 through nozzle injectors 30, a fog is formed in saturation chamber 10. Vent boxes 20 are in fluid communication with ducts 12 pressurized by blowers 16. Thus, the atmosphere in ducts 12 also becomes saturated. The saturated atmosphere then flows into deposition chamber 14.

It is not necessary that the saturated atmosphere be created with the agent. A saturated atmosphere could be formed prior to injecting an atomized liquid agent, using for example, a water base fog.

Under certain conditions, such as with low foliage, sufficient material is added in the process from the nozzles that the fine droplets are lifted into the fans and through the saturation ducts, thus also contributing to the saturation of the air. In some cases, the continued recycling of the spray and saturate air means that the air becomes oversaturated in the saturation ducts, condenses on the walls of the saturation ducts and is recovered. When the unit is run in this manner it is quite effective as the saturation chamber and the pressurization then serve as a control and recovery function.

In certain cases, the oversaturation can be achieved by producing an excess of fine droplets in the deposition chamber such that they are drawn through the fans into the saturation chamber to bring about an oversaturate condition in the inlet to the deposition area. This is especially advantageous when there is little foliage on the plants, and a high portion of the material In the atmosphere is recirculated without coming into contact with the surface of the plants. Without the control provided by the saturation chamber, the material and degree of saturation would build up until there is such an excess that it forms large drops and rains out of the tunnel or causes excess deposition an the plants.

The application of agent to the plants is controlled by restricting the flow of the saturated atmosphere into deposition chamber 14 and by regulating the output pressure of blowers 16. A baffle 36 or other restriction means may be used to restrict the size of the opening of vent box 20. Flow director 21 may also serve this purpose. In conjunction with restricting vent box 20, the output pressure of blower 16 may also be varied.

In a preferred embodiment, shown in FIG. 2, the saturated atmosphere is injected into the deposition chambers 14 from a position below the plants, generally adjacent the stalk, in an upward direction. The circulation of the atmosphere from this position and the deposition process resulting from the atmosphere thereof, reduces shingling effects. As the oversaturated atmosphere contacts the plants providing conditions for the effective wetting of the surfaces, the agent condenses on the plants. The condensation forms relatively evenly on both upper and lower sides of the plants, thereby providing an even and thorough application of the agent. At the same time, the agent coagulates in small droplets in the air surrounding the plants. These droplets contact the plant surfaces at a low kinetic energy, further increasing the coverage of the agent on the plants.

Figure 2:
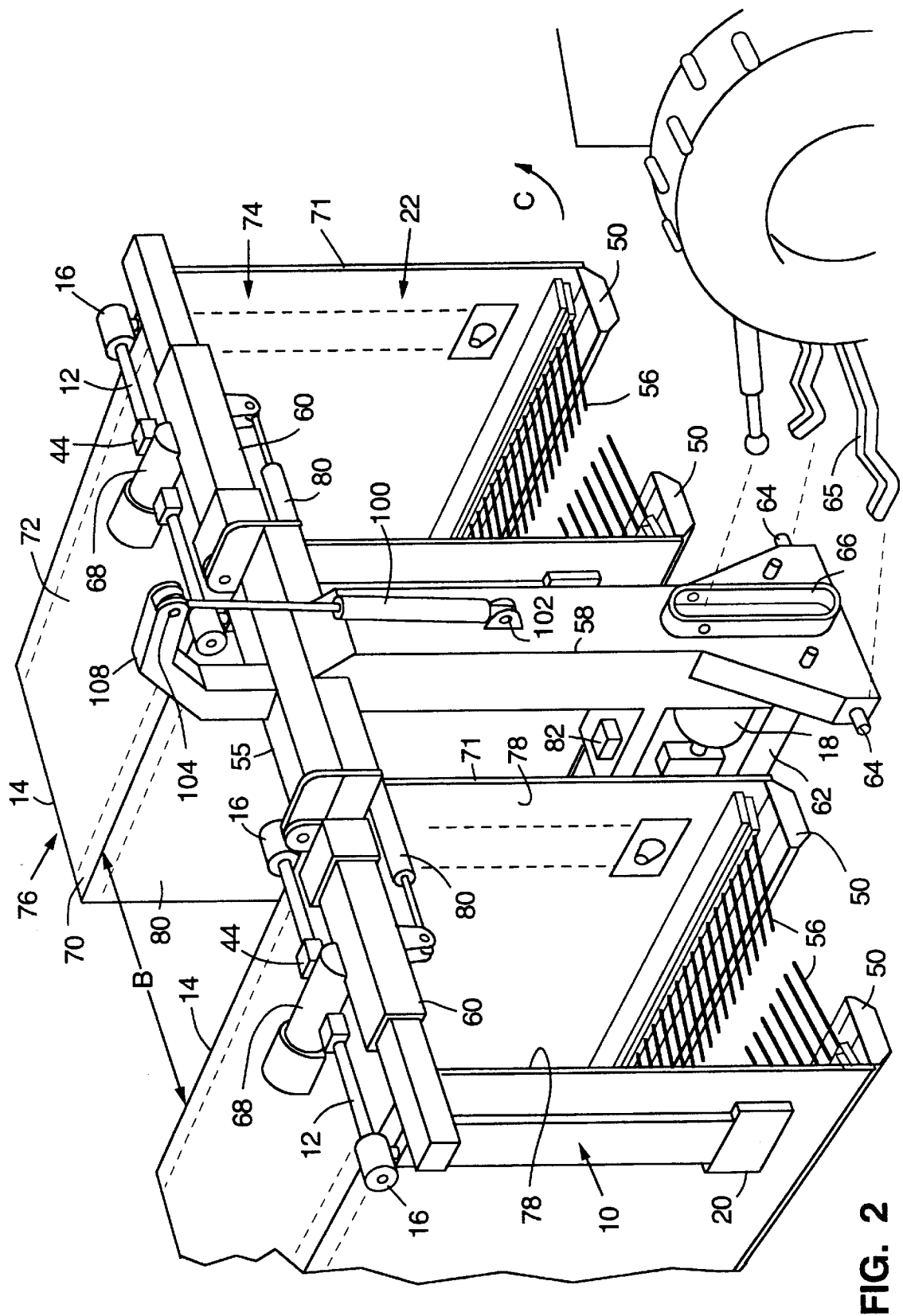
FIG. 2 is a perspective view of an apparatus according to the invention.

In the embodiment of the invention shown in FIGS. 1 and 2, the oversaturated atmosphere is circulated back into saturation chamber 10 via intake boxes 44 mounted on deposition chambers 14. Intake boxes 44 are in communication with the air fluid flow in ducts 12 and deposition chamber 14. As a result of the draw created by blowers 16, the oversaturated atmosphere is drawn through a vent 46 (shown in FIG. 1) formed in intake box 44. The oversaturated atmosphere moves through intake box 44 and back into ducts 12 for circulation through the saturation chamber 10.

As the oversaturated atmosphere moves through intake box 44 it is heated by a radiator 48. The radiator 48 is mounted within intake box 44 such that it is at least partially exposed to interior cavity 22 of deposition chamber 14. The heating increases the amount of condensation that forms on the plants, thereby making the application of the agent, more efficient. The radiator 48 carries warm hydraulic fluid from hydraulic pump 18. Thus, radiator 48 cools the hydraulic fluid for the operation of hydraulic pump 18, while simultaneously warming the oversaturated atmosphere. Equivalent heating means such as electric heaters or other heaters known in the art may also be used.

Figure 3:
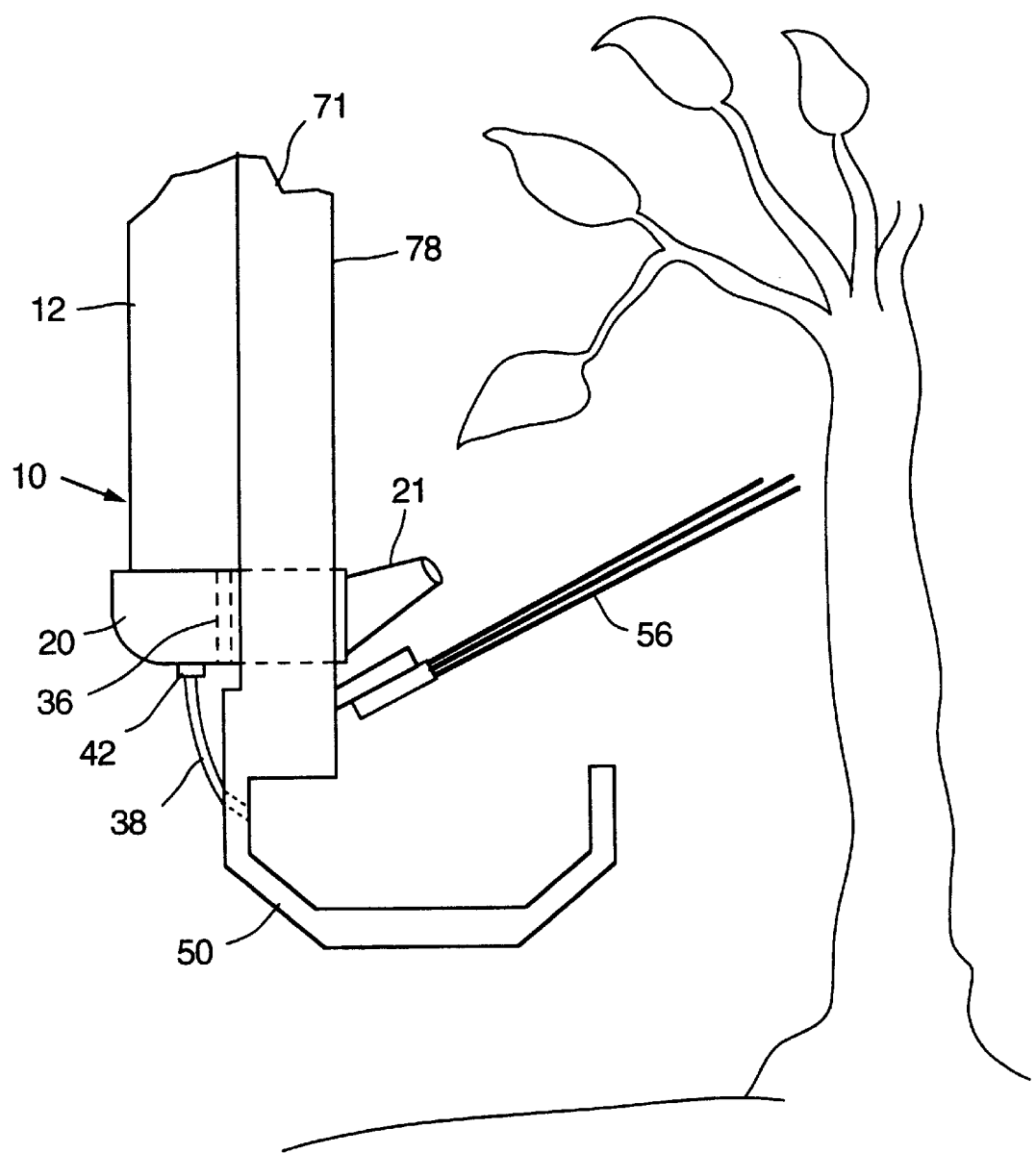
FIG. 3 is a detail view of an apparatus according to the invention.
Figure 4A:
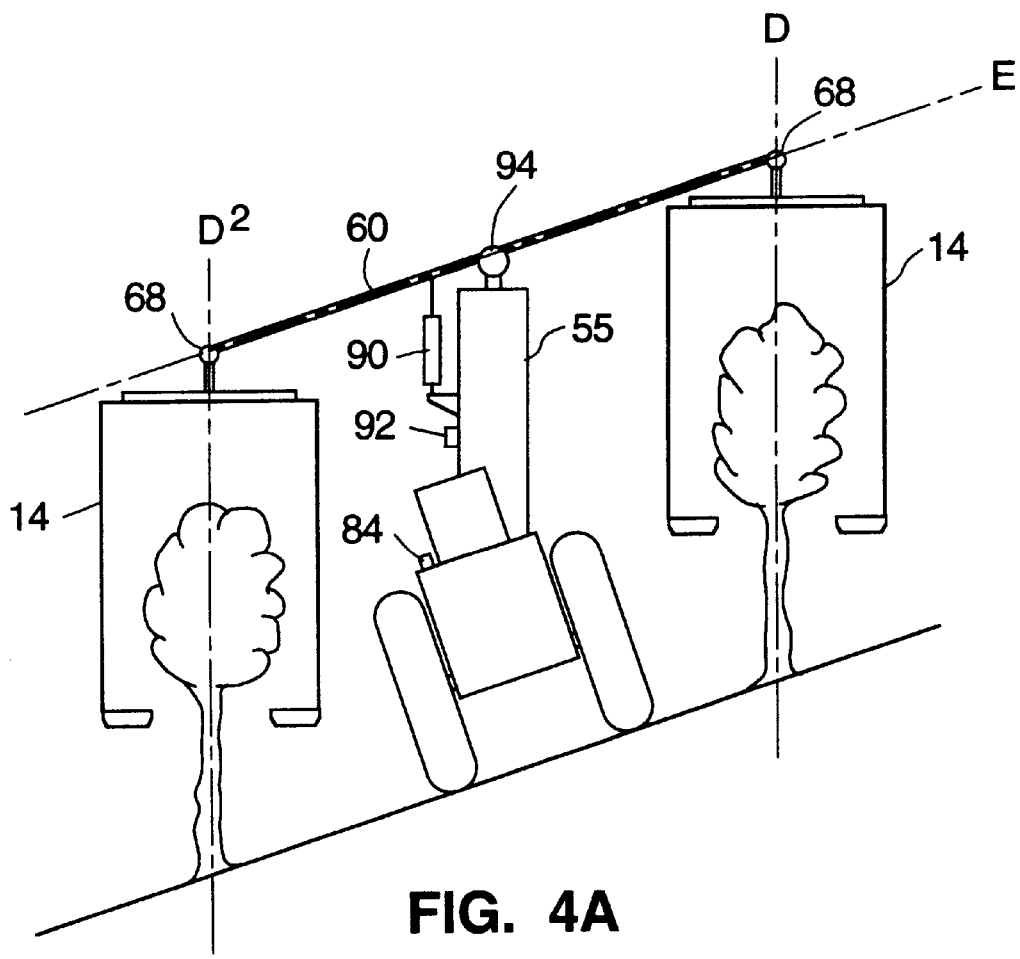
FIG. 4A is a front view of an apparatus according to another aspect the invention.
Figure 4B:
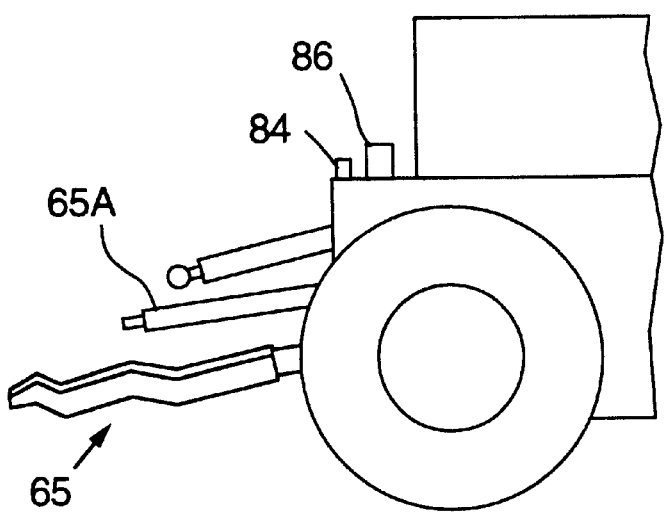
FIG. 4B is a detail view of an embodiment of a 3-point hitch connection according to the invention.

As shown in FIGS. 1, 2, and 3, applicant's invention is provided with a recovery and recirculation means for capturing excess agent which does not stay on the plants, and recirculating it back into feed tank 28. Recovery troughs 50 channel excess agent into a sump 40 via a fluid conduit 38 and then through a series of filters 52. A syphon 54 then moves the recovered agent through fluid conduit 38 back into feed tank 28. Alternatively, a sump pump could also be used. During recovery and recirculation, excess condensate captured on brushes 56 and on wall surfaces 71 inside deposition chamber 14, drain into sump 40 and is drawn back into feed tank 28 via syphon 54. In another embodiment of the invention flaps may be used in place of brushes 56. Additional excess agent which condenses in vent boxes 20 also drains through an opening 42 into the sump 40 via fluid conduit 38.

A preferred structural embodiment of the invention is shown in FIG. 2, wherein deposition chambers 14 are pivotally coupled to a tower frame 55. The plurality of saturation chambers 10 are mounted to deposition chambers 14.

Tower frame 55 has a main support member 58, two telescoping arms 60 extending laterally from main support member 58, a support frame 62, a 3-point hitch connection 64, and a power take off shaft (PTO) 66. A rotating joint 68 couples deposition chambers 14 to telescoping arms 60 on either side of the tower frame 55. Thus, deposition chambers 14 may rotate in the direction shown by arrow "C" to compensate for variations in the grade of the ground surface.

The invention can be practiced with one or more deposition chambers 14 depending upon the number of rows of plants which are to be simultaneously treated. The apparatus is suspended above the ground and moved over one or more rows of plants by a conventional tractor. The apparatus is coupled to the tractor using a standard 3-point hitch 65 such as the M5950 SAE Category I and II hitch manufactured by Kubota Tractor Corporation in Compton, Calif. Using 3-point hitch 65, the elevation of the apparatus in relation to the ground surface may be adjusted. In an alternative embodiment, a drive means may be incorporated into the structure of tower frame 55 thereby eliminating the need for a separate tractor.

In the preferred embodiment, the two deposition chambers 14 shown in FIG. 2, are comprised of a chamber support frame 70, each having a pair of wall portions 71, a cover portion 72, an ingress opening 74, and an egress opening 76. Deposition chambers 14 are constructed in a U-shape such that the intersection between wall portions 71 and cover portions 72 define interior cavity 22 through which the rows of plants pass through. Wall portions 71 also have an interior surface 78 and an exterior surface 80.

It is preferred that the saturation chambers are incorporated into the assembly that comprises the front of the tunnel. It is also desirable to have the front of the tunnel radiussed so that it does not catch on plants, and guides overhanging portions of foliage through the tunnel. In a preferred embodiment the front of the tunnel is stainless steel, with a radius of 4" on the legs of the tunnel, which also form the saturation chamber. The fans pressurize these chambers, and direct the air from the bottom of the duct (or elsewhere along the duct should the crop require it) into the deposition chamber. The tunnel pivot and the fans all mount on the duct assembly, which facilitates the rotation of the tunnels to clear the crops.

Figure 6A:
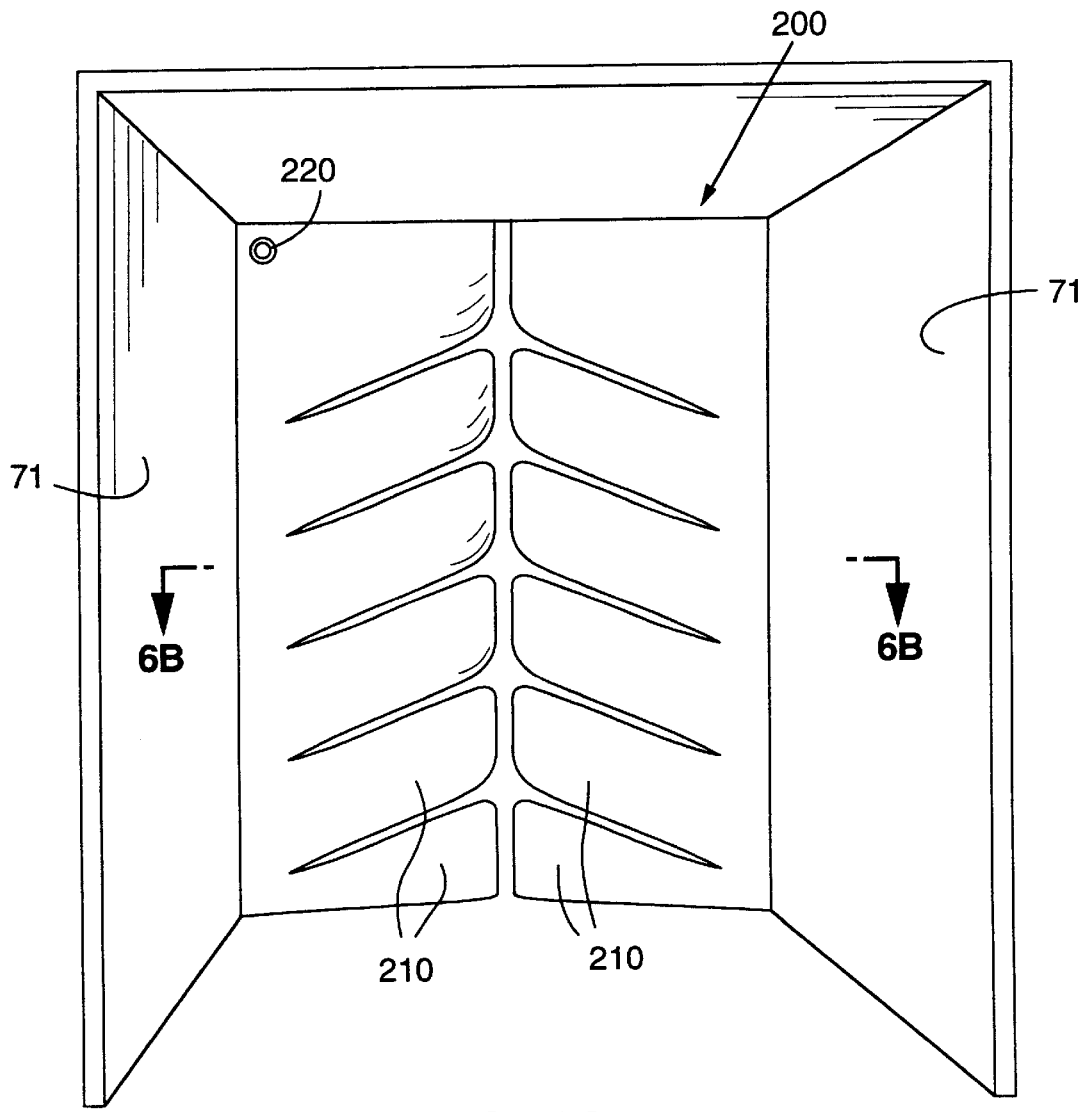
FIG. 6A is a detail view of an embodiment of a sealing curtain according to the present invention.
Figure 6B:
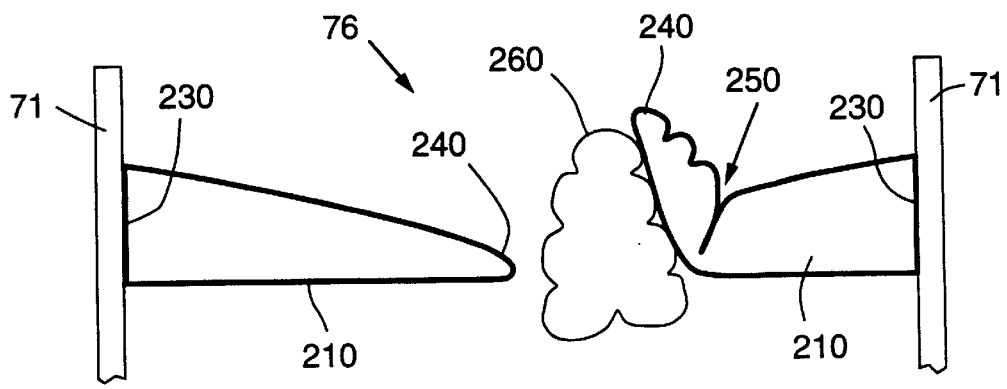
FIG. 6B is a cross-sectional view of the curtain shown in FIG. 6A.
Figure 7A:
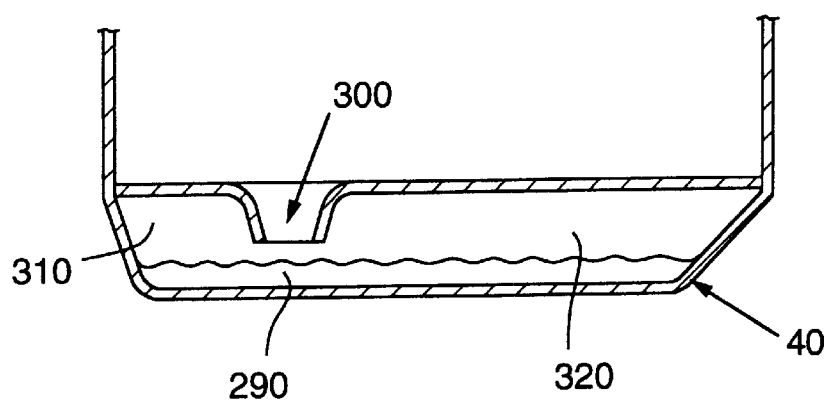
FIG. 7A is a cross-sectional view of an embodiment of a sump according to the invention.
Figure 7B:
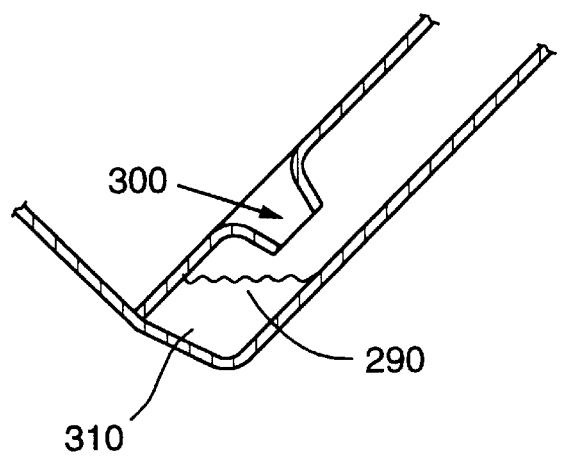
FIGS. 7B and 7C are cross-sectional views of the sump shown in FIG. 7A showing the liquid position when the deposition chamber is tilted forwards or backwards respectively.
Figure 7C:
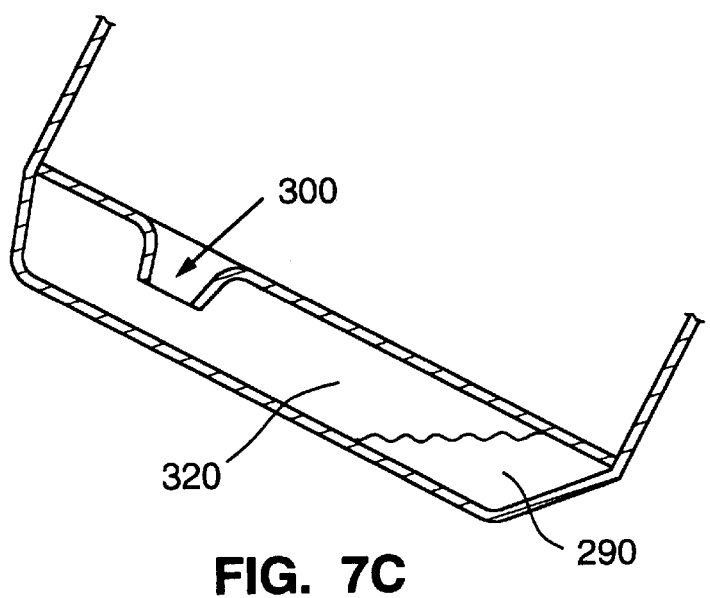
Figure 8A:
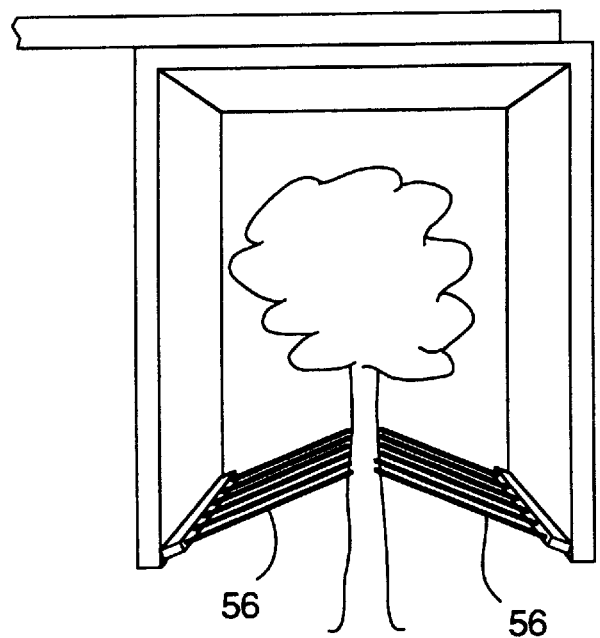
FIG. 8A is a front perspective view of a deposition chamber in working position.
Figure 8B:
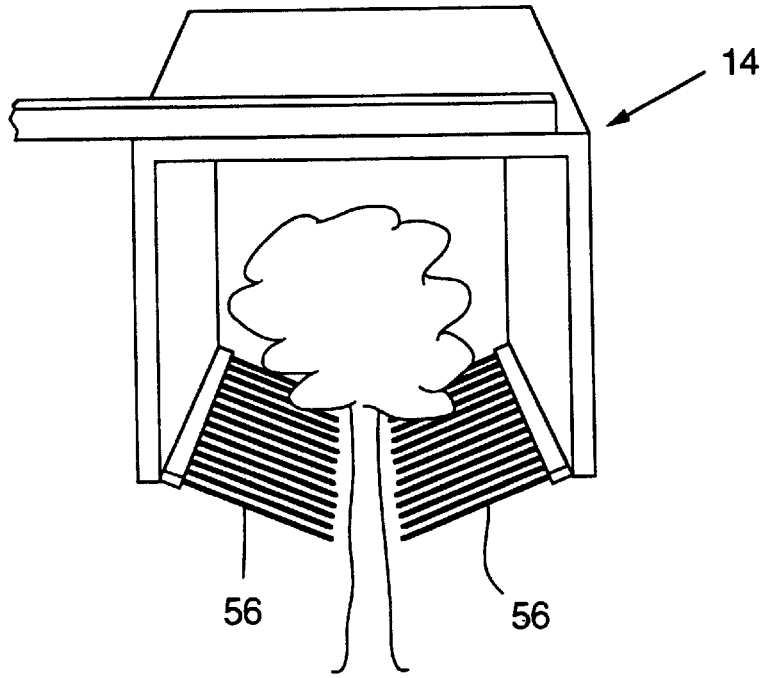
FIG. 8B is a front perspective view of the deposition of FIG. 8A as it is being raised to a tilted position.

A pair of flexible brushes or flaps (See FIGS. 6A and 6B) for containing the oversaturated atmosphere in the deposition chamber 14 may be coupled on chamber support frame 70 so as to cover ingress opening 74 and egress opening 76. Wall portions 71 may be formed of a suitable metal or plastic, or wall portions 71 may consist of a durable rubber drape, or equivalent.

One factor in the efficiency of a sprayer is the ability of the flaps to seal the rear of the tunnels. In addition to flaps and brushes, it is possible to use an inflatable curtain. This embodiment has significant advantages, as the "stiffness" of the flaps is a function of the air pressure and the cross section of the inflated fingers. By using a very light fabric, such as rip-stop nylon or polyester, the fingers can be made soft enough that they can close tightly around the plant without inflicting damage. In addition, the shape of the "fingers" can be such that any spray collecting on them is directed towards the sides of the tunnels where it will collect into the recovery trough. The pressure from the fans on the saturation chamber will be sufficient to keep the flaps inflated.

FIG. 6A shows a suitable means for sealing the rear of the tunnels. This embodiment includes an inflatable curtain 200 which is positioned to seal the egress 76 of the deposition chamber. The inflatable curtain 200 includes a number of fingers 210 and may be inflated via an air inlet 220 using the pressure from the blowers 16 (not shown). FIG. 6B shows a cross section of the inflatable curtain. The fingers 210 are wider at their outer edge 230 and taper to a thinner cross section at their center 240. This cross section allows the fingers to fold at a fold point 250 when they are pressed against foliage 260 as happens as the tunnel is advanced along a row. After the inflatable curtain has passed a piece of foliage, the fingers 210 will regain their original shape due to their internal pressure. In this way, no spring mechanism is needed to reseal the curtain after vegetation has passed through the egress opening of the tunnel. An inflatable curtain similar to the one in FIG. 6A could also be used to seal the ingress opening 74 of the deposition chamber.

In another embodiment of the invention the entire tunnel assembly may be made of a tensile structure inflated by the blowers used to pressurize the saturation chamber. This would be very advantageous for larger plants and trees and would allow simple collapse of the tunnel unit for transportation. With the correct design of a folding frame, this would allow the application of the technology to larger fruit trees. In this embodiment, the tunnel could consist of a top frame to hold the fans and a rigid trough at the bottom to collect unused agent. The tunnel walls 71 and roof 72 could consist of an inflatable tensile structure and the tunnel could also include inflatable curtains as described above.

Referring to the detail view shown in FIG. 3, recovery trough 50 extends along the lower edge of wall portion 71 on interior surface 78. The recovery trough 50 is sloped such that it acts as a channel and drains excess agent, which has condensed from the oversaturated atmosphere into sump 40 (shown in FIG. 1). Brushes 56 (or flaps), extend at an inclination relative to the ground surface, from interior surface 78 into interior cavity 22 of deposition chambers 14. Brushes 56 (or flaps), located in proximity to the lower edge of interior surface 78, extend to an intermediate position in deposition chambers 14. The brushes 56 (or flaps) flex against the trunks or stalks of the plants and assist in filtering loose materials in the plants from the excess condensate. The brushes 56 (or flaps) are made of plastic, metal, or other equivalent material, but the brushes (or flaps) should be of sufficient flexibility such that the plants are not damaged upon contact.

The brushes 56 (or flaps) may also be insulated from interior surface 71 and used to apply a static charge to the plants for the purpose of electrostatically precipitating moisture from the oversaturated atmosphere. This requires the use of brushes 56 (or flaps) which are electrically conductive, as well as a charging means capable of producing a static electric charge.

In a preferred embodiment, shown in FIG. 2, the apparatus of the invention includes a means for adjusting for variations in the width between rows of plants. Thus, width "B" between deposition chambers 14 can be adjusted to correspond to the width between rows of plants. The width adjusting means comprises telescoping arms 60, a pair of hydraulic arms 80, and a control means 82. One end of hydraulic arm 80 connects to a segment of telescoping arm 60. The other end of hydraulic arm 80 connects to tower frame 55. Hydraulic arms 80 are driven by hydraulic pump 18 which may be mounted on support frame 62. Hydraulic pump 18 is supplied with power via the PTO 66 from the tractor which carries the apparatus. When the control means 82 activates hydraulic arms 80, telescoping arms 60 are extended or retracted, and deposition chambers 14 are correspondingly displaced in a direction away from or towards each other, thus increasing or decreasing width "B".

Referring to FIGS. 4A and 4B, the invention also includes a means for levelling. The levelling means compensates for variations in the grade of the ground surface such that a vertical axis "D" of deposition chambers 14 may be maintained in a position substantially parallel to a vertical axis of the plants "$D^2$". The levelling means comprises a means for maintaining frame tower 55 in a vertical position and a means for adjusting a horizontal axis of telescoping arms 60.

The means for maintaining frame tower 55 in a substantially vertical position comprises a levelling sensor 84 and 3-point hitch 65 (shown in FIG. 4B) wherein one of the three levers is a hydraulic lever 65A. In the preferred embodiment, an Automatic Platform Leveler Model 410 manufactured by P-Q Controls Inc. in Bristol, Conn., is used as levelling sensor 84. The levelling sensor 84 is mounted on the tractor and detects changes in the grade of the ground surface. In response to any such changes, leveling sensor 84 sends a signal to an actuator 86 which controls hydraulic lever 65A. Movement of hydraulic lever 65A causes a corresponding change in the position of tower frame 55, which is suspended above the ground surface by the connection to 3-point hitch 65. In this manner, tower frame 55 can be held in a substantially vertically position.

As shown in FIG. 4A, when the apparatus is on a graded ground surface, the horizontal axis "E" of telescoping arms 60 is maintained at a substantially parallel position relative to the ground surface. In a preferred embodiment, the means for adjusting the horizontal axis of telescoping arms 60 comprises a levelling sensor 84, a hydraulic cylinder 90, a second actuator 92, and a second rotating joint 94, which couples telescoping arms 60 to tower frame 55. Hydraulic cylinder 90 is coupled at one end to tower frame 55 and at the other end to telescoping arm 60. When the apparatus is on a graded surface, levelling sensor 84 detects the change in grade and sends a signal to second actuator 92. In response, second actuator 92 causes hydraulic cylinder 90 to extend or retract. The action of hydraulic cylinder 90 causes telescoping arms 60 to rotate about second rotating joint 94, thereby changing the horizontal axis of telescoping arms 60. Since deposition chambers 14 are coupled to telescoping arms 60 via rotating joint 68, the vertical axis "D" of the deposition chambers 14 can be maintained parallel to the vertical axis "$D^2$" of the plants, despite changes in the grade of the ground surface. This configuration allows the plants to pass through deposition chambers 14 in an unobstructed manner.

Levelling sensor 84 may be pre-set such that the vertical position of tower frame 55 and the horizontal position of telescoping arms 60 may be maintained constant.

In another embodiment of the invention, the telescoping arms 60 may be articulated at joint 94 so that they may be raised or lowered independently. In this way, the unit may be used for treating terraced crops.

In another embodiment of the invention, the tunnels can rotate laterally about the pivot (when viewed from the front)

such that the tunnels may deflect upon collision with an obstacle. While the tunnels will hang in a vertical position, the amount of rotation can be controlled by springs or limit stops.

Figure 5:
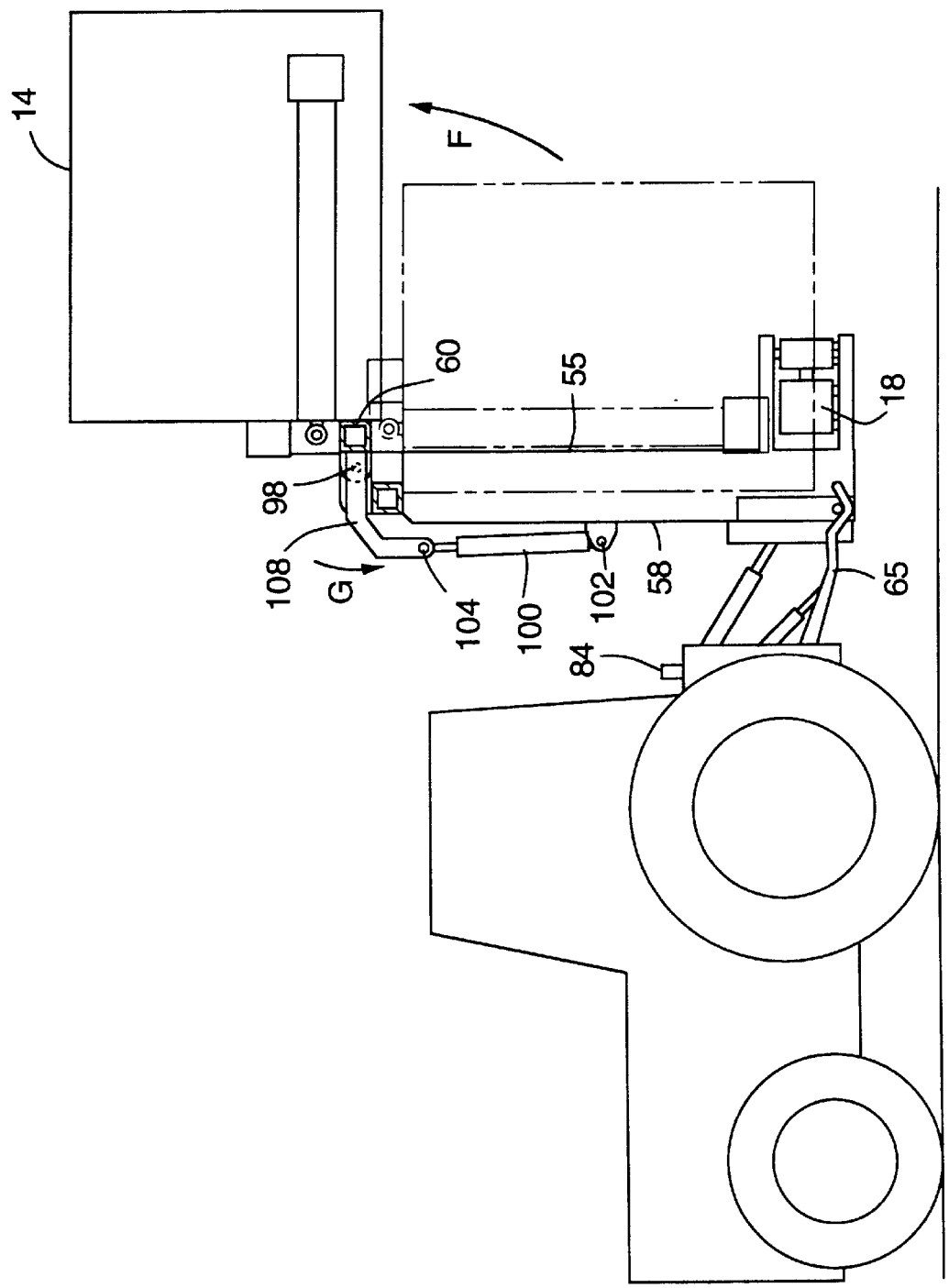
FIG. 5 is a side view of an apparatus according to yet another aspect of the invention showing the deposition chambers in a lift position.

As shown in FIG. 5, a further embodiment of the invention comprises a means for lifting deposition chambers 14 above the plants. Telescoping arms 60 are pivotally coupled to tower frame 55 through pivot connection 98. A hydraulic arm 100 or equivalent driving means, powered by hydraulic pump 18, is connected at one end 102 to main support 58. At the other end 104, hydraulic arm 100 is coupled to a cantilever member 108. Cantilever member 108 is integrally formed with telescoping arms 60.

When hydraulic arm 100 is retracted, cantilever member 108 is pulled towards the ground surface as shown by arrow "G" in FIG. 5. As a result, telescoping arms 60 are rotated about pivot connection 98 in the direction shown by arrow "F". The deposition chambers 14 are thereby rotated to a position above the plants so that deposition chambers 14 pass over the tops of the plants when the tractor and apparatus are turned. Thus, the turning radius of the tractor is not increased when utilized with the apparatus of the present invention. Consequently, the tractor and the present invention may turn around in small headland areas typical in planted fields, especially fields planted with trellised crops such as grapes, without colliding with the plants.

The tilting of the tunnels described above reduces the length and width of the sprayer that might come into contact with the crops when turning the tractor between rows. The tower raises the pivot height of the tunnels so that they clear the crop, and thereby reduce both the lateral and fore and aft overhang that might come into contact with the crops and thus minimize the area required to turn the tractor. The tilting mechanism is very different than the conventional use of farm equipment that is raised on a 3 point hitch for reasons of transportation and ground avoidance. In conventional use a cultivating tool such as a plow is tilted up to get it clear of the ground (not the crops) when turning and transporting; whereas, in the present invention the deposition chambers are lifted using a pivot point that is above the crops to facilitate the tractor turning between rows.

FIG. 7A shows another embodiment of the invention in which the tunnel assembly include a sump 40 for containing reusable agent 290 collected in troughs 50 (not shown). In this embodiment, the sump 40 includes a central collection port 300 and front and rear reservoir area 310 and 320.

FIG. 7B shows the sump arrangement when the tunnel assembly is in its tilted position. In this case, the reusable agent 290 flows into the front reservoir area 310 and does not overflow out of the collection port 300.

FIG. 7C shows the sump arrangement when the tunnel assembly is tilted backwards which will happen when the unit is traversing steep uphill terrain. In this case, the reusable agent 290 flows into the rear reservoir area 320 and does not overflow out of the collection port 300.

In the embodiment of the present invention in which the tunnels can tilt, it is preferred to make the flaps or brushes (Element 56 shown in FIGS. 2 and 3) on the bottom of the tunnel so that they deflect downwards when the tunnels are tilted to avoid damaging the crops.

FIG. 8A shows the brushes or flaps 56 in their operating, upwardly inclined position. FIG. 8B shows the brushes or flaps 56 in their downward position which enables the tunnel assembly 14 to be tilted without damaging any crops which may be contained in the tunnel.

Although only certain embodiments have been described in detail, those skilled in the art will understand that many modifications are possible without departing from the teachings hereof. All such modifications are intended to be encompassed within the following claims.

What is claimed is:

1. An apparatus for applying an agent to plants, comprising:

deposition chamber including a roof and side walls having one or more inlet vents, an ingress opening for permitting the passage of plants into the deposition chamber, and an egress opening for permitting the passage of plants out of the desposition chamber;

a saturation chamber connected to the deposition chamber by the inlet vents;

means for creating and maintaining a saturated or oversaturated atmosphere containing an agent in the saturation chamber, and for transferring said saturated or oversaturated atmosphere from said saturation chamber to said deposition chamber via a pressure difference maintained between said saturation chamber and said deposition chamber.

2. An apparatus according to claim 1, further comprising:

means for extracting at least a portion of an atmosphere from the deposition chamber and returning it to the saturation chamber.

3. An apparatus according to claim 1, further comprising:

means for recovering excess agent from the deposition chamber and introducing it into the saturation chamber.

4. An apparatus for applying an agent to plants, comprising;

a deposition chamber including a roof and side walls having one or more inlet vents, an ingress opening for permitting the passage of plants into the deposition chamber, and an egress opening for permitting the passage of plants out of the deposition chamber;

a saturation chamber connected to the deposition chamber by the inlet vents;

means for creating and maintaining a saturated or oversaturated atmosphere containing an agent in the saturation chamber, and for transferring said saturated or oversaturated atmosphere from said saturation chamber to said deposition chamber via said vents;

means for recovering excess agent from the deposition chamber and introducing it into the saturation chamber, wherein said means for recovering said excess agent comprises a condensate recovery system, the system including a plurality of brushes or flaps extending inwardly from said side walls at an angle such that condensate which falls thereon runs toward and is collected in collection troughs positioned along a lower edge of each of said side walls, and at least one collection reservoir for receiving condensate collected in said troughs.

5. An apparatus according to claim 4, further comprising means for imparting an electrostatic charge to said flaps or brushes.

6. An apparatus according to claim 4 further comprising means for lifting the desposition chamber from a first lower position to a second raised position.

7. An apparatus according to claim 6 further comprising means for adjusting the angle at which said flaps or brushes are positioned from an upward angle when said apparatus is in said first lower position to a downward angle for movement from said lower to said second raised positioned.

8. An apparatus according to claim 1, further comprising:

means for controlling the rate of transfer of the saturated or oversaturated atmosphere from said saturation chamber to said deposition chamber.

9. An apparatus according to claim 1 further including a second deposition chamber.

10. An apparatus according to claim 9 further comprising means for adjusting a distance between said chambers to permit the chambers to be positioned over adjacent rows of plants at varying row width distances.

11. An apparatus according to claim 9 further comprising support means for supporting said deposition chambers and means for levelling said chambers in response to changes in a grade of a surface over which said support means is travelling.

12. An apparatus according to claim 1 further comprising means for lifting the deposition chamber from a first lower position to a second raised position.

13. An apparatus according to claim 12 wherein said desposition chamber is positioned at a height which is greater than the height of plants to be treated using the apparatus when said deposition chamber is in said second raised position.

14. An apparatus according to claim 1, further comprising a sealing curtain positioned to cover the egress opening.

15. An apparatus according to claim 14 wherein said curtain comprises inflatable fingers.

16. An apparatus according to claim 1 wherein said roof and walls are inflatable.

17. An apparatus for appalling an agent to plants, comprising:

a deposition chamber including a roof and side walls having one or more inlet vents, an ingress opening for permitting the passage of plants into the deposition chamber, and an egress opening for permitting the passage of plants out of the deposition chamber;

a saturation chamber connected to the deposition chamber by the inlet vents;

means for creating and maintaining a saturated or oversaturated atmosphere containing an agent in the saturation chamber, and for transferring said saturated or oversaturated atmosphere from said saturation chamber to said deposition chamber via said vents; and means for heating the saturated or oversaturated atmosphere.

18. An apparatus for applying an agent to plants, comprising:

a deposition chamber including a roof and side walls having one or more inlet vents, an ingress opening for permitting the passage of plants into the deposition chamber, and an egress opening for permitting the passage of plants out of the deposition chamber;

a saturation chamber connected to the deposition chamber by the inlet vents;

a spray nozzle for spraying agent into the saturation chamber to create a saturated or oversaturated atmosphere;

a blower for moving at least a portion of said saturated or oversaturated atmosphere from said saturation chamber to said deposition chamber via said inlet vents;

plurality of brushes or flaps extending inwardly from said side walls;

a trough positioned at a lower edge of said side walls for collecting excess agent; and a pump for returning excess agent from the trough to said nozzle.

19. An apparatus according to claim 18, further comprising:

means for controlling the rate of transfer of said atmosphere from said saturation chamber to said deposition chamber.

20. An apparatus according to claim 18 further comprising means for lifting the deposition chamber from a first lower position to a second raised position, wherein said deposition chamber is positioned at a height which is greater than the height of plants to be treated using the apparatus when said deposition chamber is in said second raised position.

21. A method for applying an agent to plants, comprising the steps of:

a) creating an atmosphere at a first pressure which is saturated or oversaturated with an agent;

b) transferring said atmosphere to a deposition chamber which is at a pressure less than said first pressure so as to expose a plant in said deposition chamber to said saturated or oversaturated atmosphere.

22. The method according to claim 21, further comprising the step of moving the deposition chamber along a horizontal surface that plants pass through the deposition chamber.

23. The method according to claim 21, further comprising the step of recirculating at least of portion of said atmosphere in said deposition chamber back to said saturation chamber.

24. A method for applying an agent to plants, comprising the steps of:

creating an atmosphere which is saturated or oversaturated with an agent;

exposing a plant to said saturated atmosphere in a deposition chamber; and heating said atmosphere.

25. A method for applying an agent to plants, comprising the steps of:

creating and maintaining an atmosphere containing said agent at a first pressure;

circulating said atmosphere into a deposition chamber in which plants are positioned and which deposition chamber has a second pressure less than said first pressure, thereby causing said atmosphere to condense onto desired surfaces of said plants and deposit said agent thereon.

26. The method according to claim 25, further comprising the step of moving the deposition chamber along a horizontal surface such that plants pass through the deposition chamber.

27. The method according to claim 25, further comprising the step of recirculating at least of portion of said atmosphere in said deposition chamber back to said chamber.

28. The method according to claim 27, furthers comprising the step of heating said atmosphere as it is recirculated.

29. The method according of claim 25, further comprising the step of controlling the rate of application of agent to the plants by con tolling a pressure difference between said first pressure and said second pressures.

30. The method according to claim 29, wherein the pressure difference is from about 3 to about 5 psi.

* * * * *